United States Patent [19]

Kotikovsky et al.

[11] Patent Number: 5,037,135
[45] Date of Patent: Aug. 6, 1991

[54] LIMITED ROTATION WEBBING GUIDE

[75] Inventors: Alexander P. Kotikovsky, Southfield; Craig A. Busch, Armada, both of Mich.

[73] Assignee: TRW Vehicle Safety Systems Inc., Lyndhurst, Ohio

[21] Appl. No.: 493,212

[22] Filed: Mar. 14, 1990

[51] Int. Cl.$^5$ .................. B60R 22/20; B60R 22/24
[52] U.S. Cl. ........................... 280/808; 280/801; 297/483; 403/113; 403/121
[58] Field of Search ............... 280/801, 802, 807, 808; 297/483; 403/113, 121

[56] References Cited

U.S. PATENT DOCUMENTS

| | | | |
|---|---|---|---|
| 4,402,528 | 9/1983 | Fohl | 280/808 |
| 4,469,352 | 9/1984 | Korner et al. | 280/808 |
| 4,473,243 | 9/1984 | Ogawa | 280/808 |
| 4,480,853 | 11/1984 | Ando et al. | 280/801 |
| 4,645,232 | 2/1987 | Hamada et al. | 280/801 |
| 4,702,491 | 10/1987 | Meyer | 280/801 |
| 4,789,186 | 12/1988 | Andersson | 280/808 |
| 4,840,403 | 6/1989 | Escaravage | 287/483 |

Primary Examiner—Charles A. Marmor
Assistant Examiner—Tamara L. Finlay
Attorney, Agent, or Firm—Tarolli, Sundheim & Covell

[57] ABSTRACT

An apparatus for guiding a length of seat belt webbing relative to the body of a vehicle includes a D-ring with a slot through which the webbing can extend. A bolt is fixed to the webbing guide and has a portion extending through an opening in a bracket fixed to the body of the vehicle. The surfaces on the bracket which define the opening in the bracket include a pair of stop surfaces. The bolt is pivotable relative to the bracket. A surface on the bolt abuts the stop surfaces on the bracket to limit rotation of the bolt relative to the bracket and prevent the D-ring from rotating so far forward that the edge of the belt webbing jams or twists in the end of the slot.

16 Claims, 3 Drawing Sheets

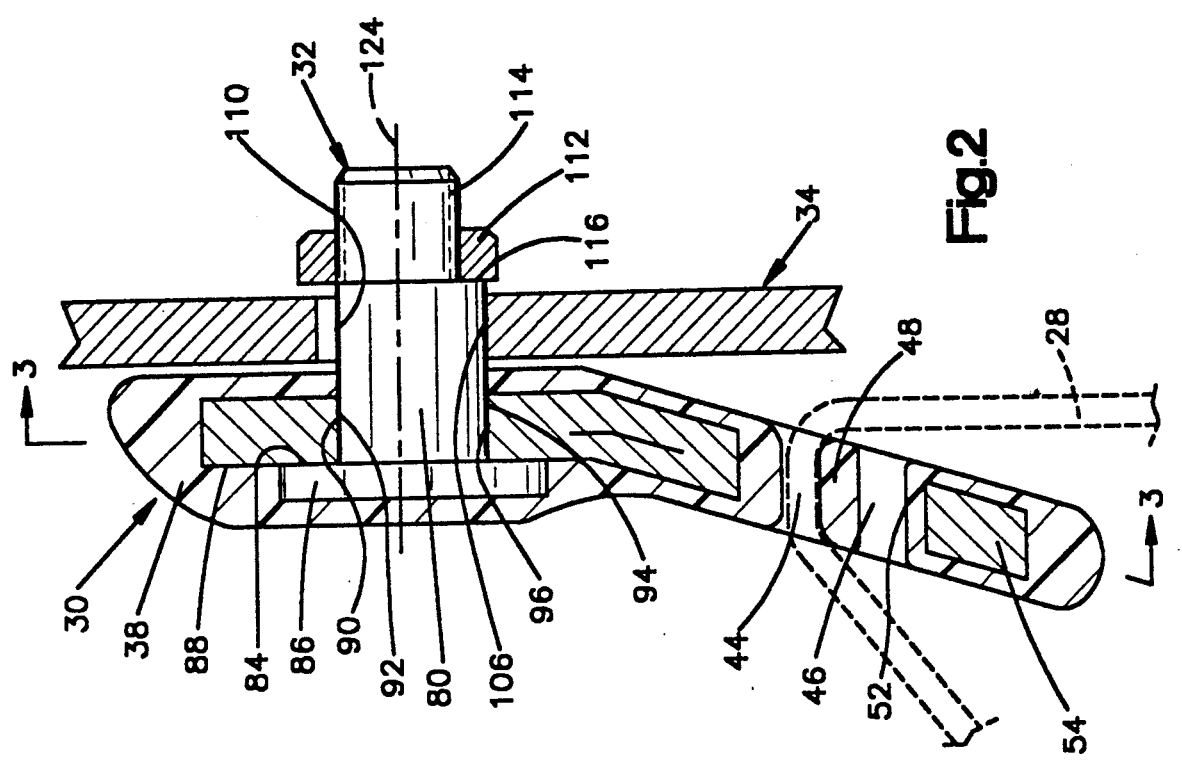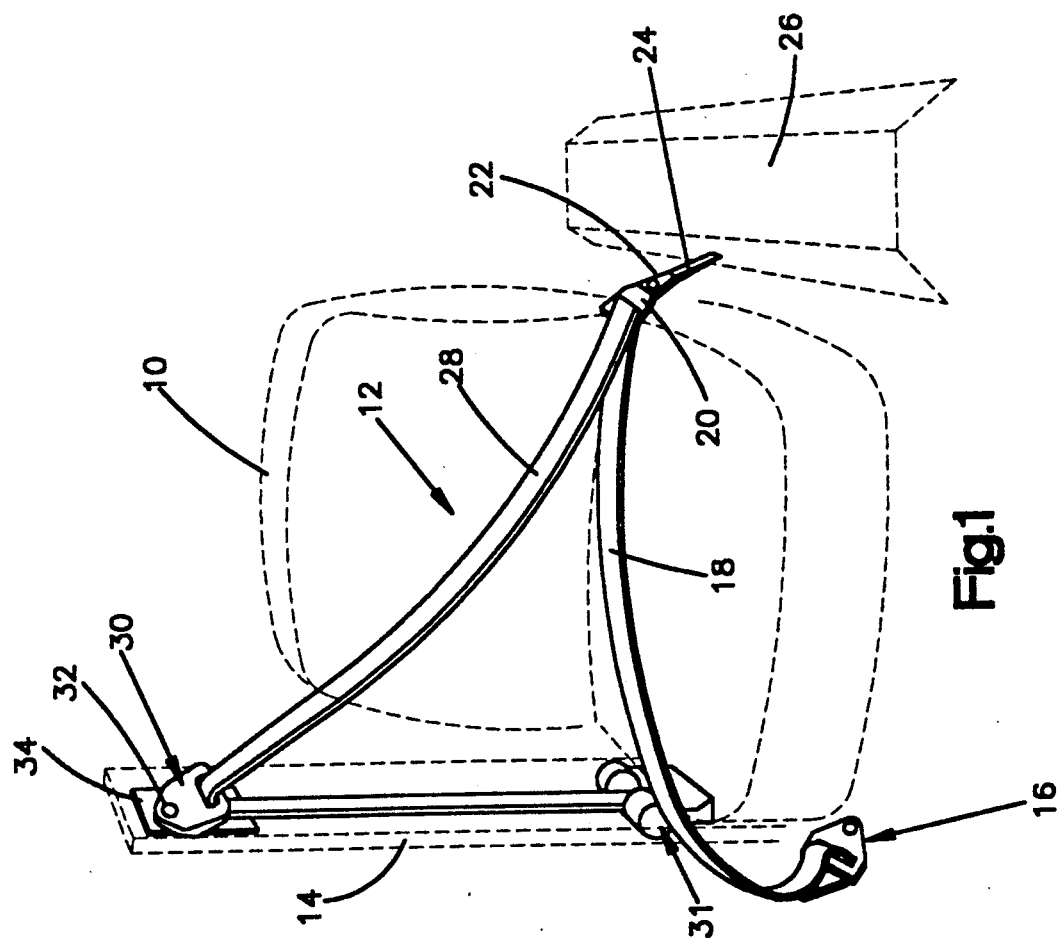

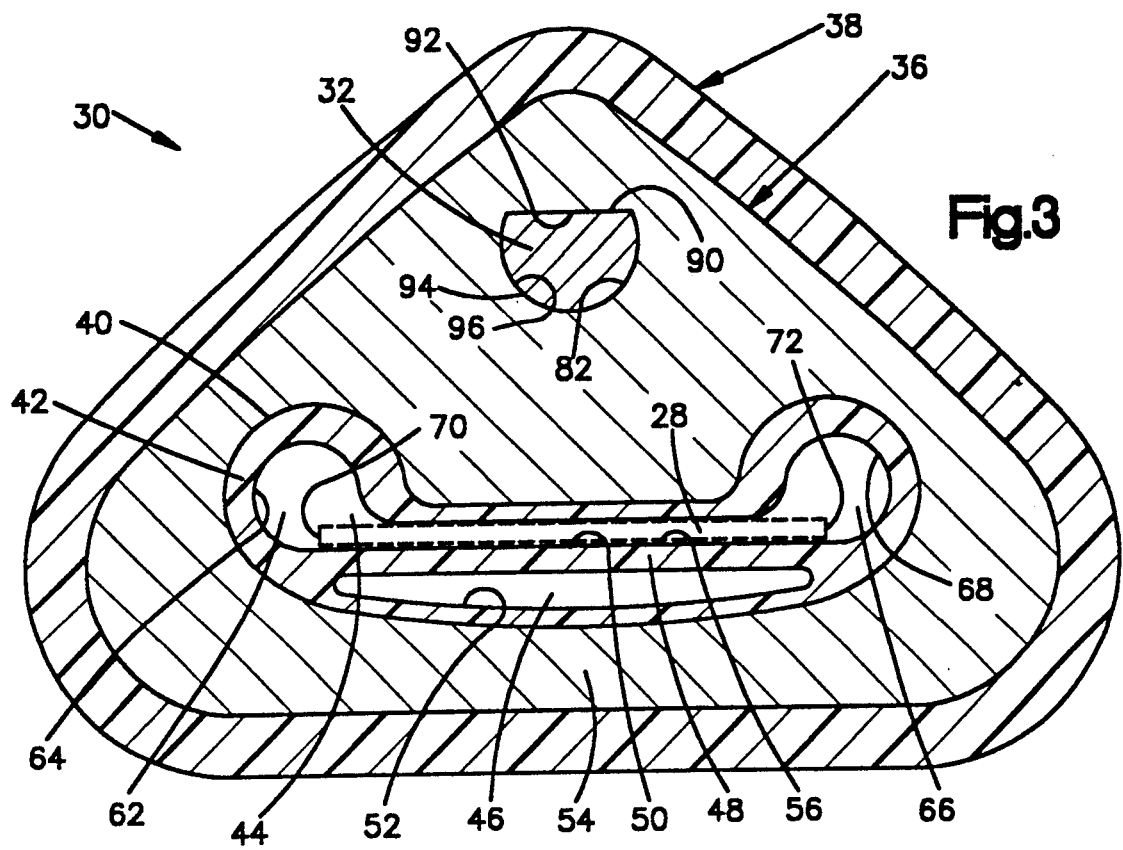
Fig.3
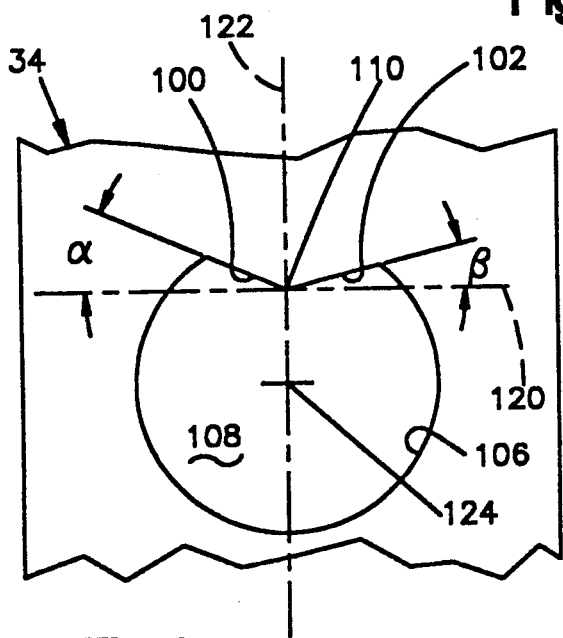
Fig.4
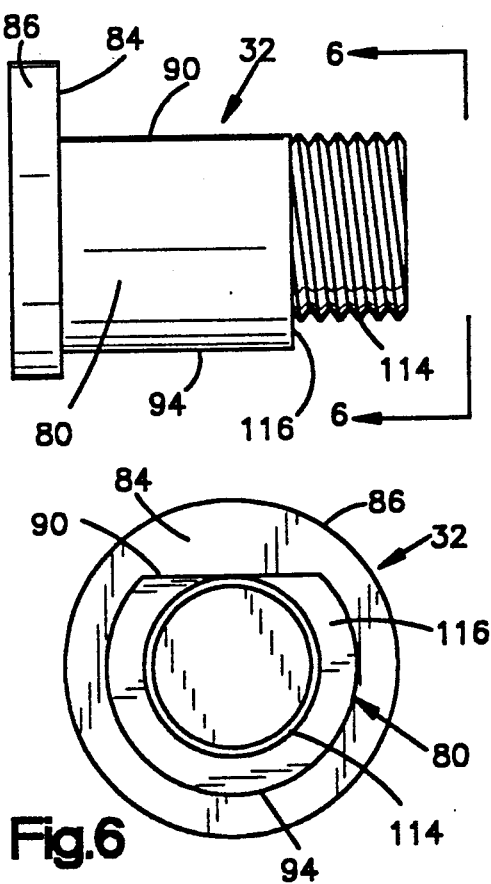
Fig.5
Fig.6

LIMITED ROTATION WEBBING GUIDE

BACKGROUND OF THE INVENTION

The present invention relates to an apparatus for guiding a length of seat belt webbing relative to the body of a vehicle, and particularly to a D-ring which guides a length of shoulder belt webbing in a vehicle.

DESCRIPTION OF THE PRIOR ART

Shoulder belt webbing is used in vehicles to restrain forward movement of the torso of a vehicle occupant in the event of sudden vehicle deceleration. In many vehicles, the shoulder belt webbing extends through a slot in a D-ring secured to the body of the vehicle at a location about opposite the shoulder of the vehicle occupant. Upon sudden vehicle deceleration, the vehicle occupant moves forward. The shoulder belt webbing is pulled forward by the occupant's forward motion. As the belt webbing moves forward, the front edge of the forwardly moving belt webbing may engage the front edge of the slot in the D-ring. If the D-ring is not free to pivot, the front edge of the forwardly moving belt webbing can jam or twist at the end of the slot, greatly increasing the stresses on the belt webbing and increasing the chance that the belt webbing will be cut or otherwise damaged by the D-ring.

U.S. Pat. Nos. 4,402,528 and 4,702,491 illustrate structures in which the D-ring is mounted for pivotal movement. The D-ring rotates forwardly due to the force of the belt webbing acting on the D-ring. This may prevent the front edge of the belt webbing from jamming or twisting at the front end of the slot in the D-ring.

However, a D-ring which is mounted for pivotal movement can sometimes rotate so far forward that the back edge of the slot in the D-ring engages the back edge of the belt webbing. This can stress the belt webbing along its back edge, damaging the belt webbing and possibly causing the belt webbing to break or be cut by the D-ring.

Making the webbing guide slot long enough to avoid hitting the belt webbing edge at either extreme would result in a D-ring which is too large from both an appearance and a cost point of view.

SUMMARY OF THE INVENTION

A D-ring which guides a length of shoulder belt webbing in a vehicle has a belt webbing guide slot through which the belt webbing extends. A part is fixed to the D-ring and has a portion for attachment to the vehicle for pivotal movement relative to the vehicle thereby to enable the D-ring to pivot relative to the vehicle. The part has at least one surface which abuts a stop surface on the vehicle after limited rotation of the part relative to the vehicle. The D-ring is thus limited from rotating so far that the back edge of the slot in the D-ring applies significant stress to the back edge of the belt webbing.

In a preferred embodiment of the present invention, a bracket member fixed to the vehicle body has an opening that extends through the bracket member. A bolt has a portion extending through the opening in the bracket member. The bolt is fixed to a D-ring. The D-ring has a webbing guide slot through which the webbing extends. The bolt and D-ring are pivotable relative to the bracket. A surface on the bolt abuts stop surfaces on the bracket after limited rotation of the bolt relative to the bracket. Thus, the D-ring is limited from excess rotation.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a vehicle seat and a safety apparatus for use in restraining movement of an occupant of the seat including a D-ring attached to the vehicle in accordance with the present invention;

FIG. 2 is a sectional view showing the D-ring of FIG. 1 mounted for rotation relative to a bracket fixed to the frame of the vehicle;

FIG. 3 is a sectional view taken along section line 3—3 of FIG. 2;

FIG. 4 is a fragmentary elevational view of the bracket shown in FIG. 2;

FIG. 5 is a side elevational view of the bolt shown in FIG. 2;

FIG. 6 is an end view of the bolt of FIG. 5 as viewed in the direction of line 6—6 of FIG. 5;

DESCRIPTION OF PREFERRED EMBODIMENT

Figure 7:
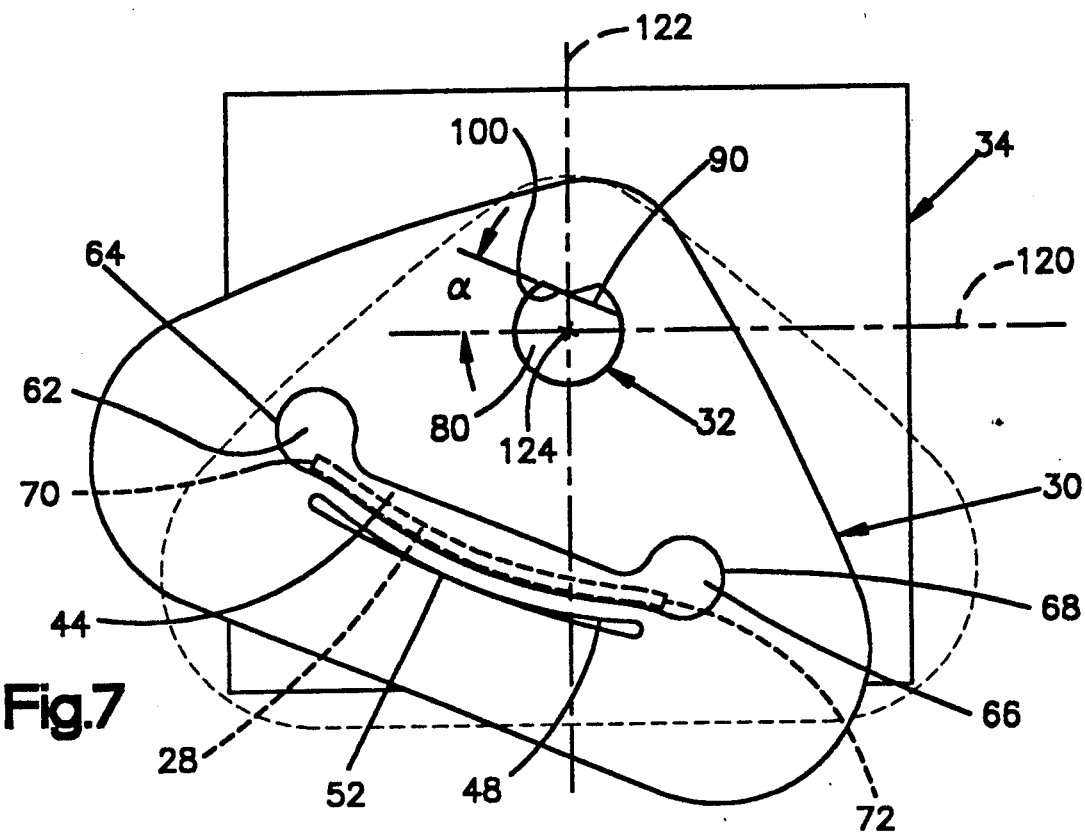
FIG. 7 is a schematic view showing the D-ring and bolt at their limit of rotation in one direction relative to the bracket.

The present invention is illustrated in FIG. 1 as applied to a safety belt system for restraining forward movement of a vehicle occupant in the event of sudden vehicle deceleration. It should be understood that the invention could be applied to other safety belt systems. In the safety belt system of FIG. 1, a vehicle occupant sits on a seat 10 which is illustrated as a front passenger seat in the vehicle. A length of belt webbing 12 is extendable about the vehicle occupant. One end of the length of belt webbing 12 is anchored to the vehicle body 14 at an anchor point 16. A lap belt section 18 of the belt webbing 12 extends across the seat 10 to a tongue assembly 20. The tongue assembly 20 is received in a buckle 22 secured by a stalk 24 to a center portion 26 of the vehicle body. A shoulder belt section 28 of the belt webbing 12 extends from the tongue assembly 20 upwardly across the seat back to a D-ring 30. The webbing 12 passes through the D-ring 30 and then extends vertically downwardly to a retractor 31.

The D-ring 30 (FIG. 3) includes a metal insert 36 around which is molded a plastic covering 38. The metal insert 36 has an opening 40. A portion 42 of the plastic cover 38 covers the edges of the opening 40 and divides the opening so as to define both a webbing guide slot 44 and an opening 46 The slot 44 and the opening 46 below it are separated by a plastic belt webbing guide bar 48. The belt webbing 28 extends through the webbing guide slot 44 and engages an upper surface 50 of the guide bar 48. The webbing guide slot 44 has a front end portion 62 which is partially defined by an edge surface 64 and a rear end portion 66 which is partially defined by an edge surface 68.

The D-ring 30 is attached by a mounting bolt 32 to a bracket 34 fixed to the vehicle body 14. The bolt 32 has a D-shaped shank portion 80 which is press fit in a D-shaped opening 82 formed in the metal insert 36 of the D-ring 30 above the opening 40. A flat surface 90 on the bolt shank portion 80 engages a flat surface 92 which partially defines the opening 82 in the D-ring 30. An arcuate surface 94 on the bolt shank portion 80 engages an arcuate surface 96 on the D-ring 30 which partially defines the opening 82 in the D-ring 30. A radially extending surface 84 (FIG. 2) on the bolt head 86 engages a major side surface 88 of the metal insert 36 to position the parts axially. The bolt 32 is thus fixed to the D-ring 30 for pivotal movement with the D-ring 30.

The bracket 34 (FIG. 4) has a pair of stop surfaces 100 and 102 which, together with an arcuate bearing surface 106, define an opening 108 through the bracket 34. The forward stop surface 100 extends at an angle alpha (α) from an imaginary horizontal line 120. The rearward stop surface 102 extends at an angle beta (β) from the imaginary horizontal line 120. The forward stop surface 100 and the rearward stop surface 102 intersect at a vertex 110 on an imaginary vertical line 122 extending through the common center of rotation 124 of the bolt 32 and the D-ring 30. It should be noted that, while the stop surfaces 100 and 102 are described as being on a bracket 34 which is separate from the vehicle body, the stop surfaces 100 and 102 could also be located on a portion of the vehicle body itself.

The D-shaped shank portion 80 of the bolt 32 (FIG. 2) extends through the opening 108 in the bracket 34. The bolt 32 is rotatable within the opening 108 in the bracket 34, with the arcuate bearing surface 94 on the bolt engaging the arcuate bearing surface 106 of the bracket 34. A nut 112 is screwed on a threaded portion 114 of the bolt 32 which projects axially from the D-shaped shank portion 80 in a direction away from the bolt head 86. The nut 112 engages a radially extending shoulder surface 116 formed on the bolt 32 at the junction of the threaded portion 114 and the shank portion 80. The nut 112 rotates with the bolt 32 and the D-ring 30. To enable the D-ring 30 and the bolt 32 to rotate relative to the bracket 34, the length of the shank portion 80 is preferably such that some axial clearance is provided between the bracket 34 and one or both of the D-ring 30 and the nut 112, as illustrated in FIG. 2.

When the belt webbing 28 is not being used to restrain a vehicle occupant, the flat surface 90 on the bolt 32 engages the vertex 110 between the forward stop surface 100 and the rearward stop surface 102. When the belt webbing 28 is in use by a vehicle occupant and is not under load caused by sudden vehicle deceleration, the flat surface 90 on the bolt 32 is located about halfway forward from the vertex 110 toward the forward stop surface 100.

Normally, the flexible guide bar 48 remains in the position shown in FIG. 3, with the belt webbing 28 disposed in a straight portion 56 of the webbing guide slot 44. In the event of sudden vehicle deceleration, forces applied to the belt webbing 28 pull the guide bar 48 toward a lower portion 54 of the metal insert 36 to engage a surface 52 of the plastic cover material 38 and close the opening 46. This gives the guide slot 44 a concave lower surface and helps to keep the belt webbing 28 centered in the guide slot 44 under load.

Under load caused by sudden vehicle deceleration, the belt webbing 12 rotates the D-ring 30 and the bolt 32. FIG. 7 illustrates schematically the D-ring 30 and the bolt 32 under load and at their limit of rotation in the forward direction relative to the bracket 34. The flexible guide bar 48 is pulled downwardly under load from the belt webbing 28 and engages the surface 52. The belt webbing 28 has rotated the D-ring 30 and the bolt 32 clockwise relative to the imaginary horizontal center line 120 and imaginary vertical line 122, by the angular amount α. The flat surface 90 on the shank portion 80 of the bolt 32 engages the forward stop surface 100 on the bracket 34, and the D-ring 30 is unable to rotate farther. Thus, the rear edge surface 68 of the webbing guide 44 is prevented from jamming against the rear edge portion 72 of the belt 28.

Figure 8:
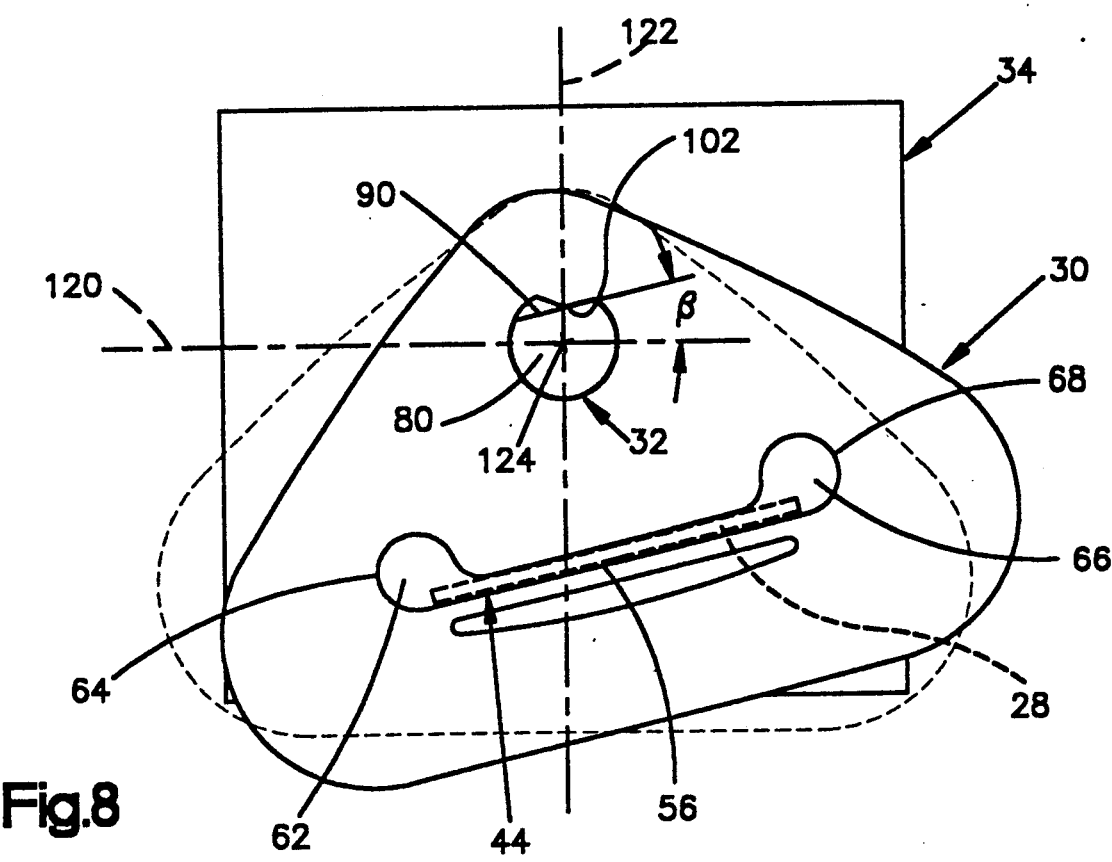
FIG. 8 is a schematic view similar to FIG. 7 showing the D-ring and bolt at their limit of rotation in the other direction relative to the bracket.

The D-ring 30 does not rotate to the rear under load, but some range of movement to the rear is provided to accommodate normal movement of the vehicle occupant in the seat 10. FIG. 8 illustrates schematically the rearward limit of rotation of the D-ring 30 and the bolt 32 relative to the vehicle and the bracket 34. The D-ring 30 and the bolt 32 have rotated counterclockwise as viewed in FIG. 8 by an angular amount β. The flat surface 90 on the shank portion 80 on the bolt 32 engage the rearward stop surface 102 of the bracket 34, blocking further rotation of the D-ring 30 in the rearward direction.

The range of allowable rotation of the D-ring 30 is thus determined by the angles α and β of the stop surfaces 100 and 102. A larger angle α allows a greater amount of rotation of the D-ring 30 in the forward direction, while a larger angle β allows a greater amount of rotation of the D-ring 30 to the rear. The range of allowable rotation of the D-ring 30 may depend on the vehicle in which the D-ring is mounted. Only enough rotation is allowed to provide for normal motion of the vehicle occupant in the seat 10. In one particular vehicle, an angle α of 23° allows sufficient forward rotation of the D-ring 30 to prevent the front edge portion 70 of the belt webbing 28 from crimping in the front end of the webbing guide slot 44, while limiting forward rotation of the D-ring 30 enough to prevent the back edge 72 of the belt webbing 28 from crimping in the back end of the webbing guide slot 44. In this particular vehicle, an angle β of 14° provides a sufficient range of rearward motion for the vehicle occupant. Selection of the angles α and β for any particular vehicle application is within the skill of the art.

From the above description of a preferred embodiment of the invention, those skilled in the art will perceive improvements, changes and modifications. Such improvements, changes and modifications within the skill of the art are intended to be covered by the appended claims.

We claim:

1. An apparatus for guiding a length of seat belt webbing relative to the body of a vehicle, comprising
    a webbing guide having a webbing opening through which the webbing can extend; and
    a part fixedly attached to said webbing guide and having a portion for attaching said webbing guide to the vehicle for pivotal movement relative to the vehicle;
    said part extending through an opening on the vehicle in a direction transverse to the direction of pivotal movement of said webbing guide and having means for limiting rotation of said part comprising at least one surface which abuts a stop surface on the vehicle after limited rotation of said part relative to the vehicle.

2. An apparatus as defined in claim 1 wherein said part is a force-transmitting member for transmitting forces from the webbing to the vehicle and said stop surface at least partially defines said opening on the vehicle.

3. An apparatus as defined in claim 1 wherein said surface of said part comprises a flat surface which abuts one of two intersecting stop surfaces on the vehicle to limit rotation of said webbing guide in a first direction of rotation relative to the vehicle, and which abuts the other one of the two intersecting stop surfaces on the vehicle to limit rotation of said webbing guide in a second direction of rotation opposite to said first direction of rotation.

4. An apparatus for guiding a length of seat belt webbing relative to the body of a vehicle, comprising
   a webbing guide having a webbing opening through which the webbing can extend; and
   a part fixedly attached to said webbing guide and having a portion for attachment to the vehicle for pivotal movement relative thereto;
   said part having means for limiting rotation of said part comprising at least one surface which abuts a stop surface on the vehicle after limited rotation of said part relative to the vehicle;
   said part being a force-transmitting bolt for transmitting forces from the webbing to the vehicle.

5. An apparatus for guiding a length of seat belt webbing relative to the body of a vehicle, comprising
   a webbing guide having a webbing opening through which the webbing can extend; and
   a part fixedly attached to said webbing guide and having a portion for attachment to the vehicle for pivotal movement relative thereto;
   said part having means for limiting rotation of said part comprising at least one surface which abuts a stop surface on the vehicle after limited rotation of said part relative to the vehicle, said surface of said part comprising a flat surface which abuts one of two stop surfaces on the vehicle to limit rotation of said webbing guide in a first direction of rotation relative to the vehicle, and which abuts the other one of the two stop surfaces on the vehicle to limit rotation of said webbing guide in a second direction of rotation opposite to said first direction of rotation;
   said part being a force-transmitting bolt having an axially extending portion on which said flat surface is formed, said bolt extending through an opening in said webbing guide and said flat surface of said bolt engaging a corresponding surface on said webbing guide to fix said bolt for rotation with said webbing guide.

6. An apparatus as defined in claim 5 including a bearing surface on said bolt for engaging in a force-transmitting manner a bearing surface on the vehicle to transmit force from the webbing to the vehicle.

7. An apparatus as defined in claim 6 wherein the vehicle includes surface means for defining an opening through which said bolt extends, said surface means including said stop surfaces and said bearing surface on the vehicle, said bearing surface on said vehicle being arcuate and said stop surfaces on said vehicle being flat stop surfaces extending from opposite ends of said bearing surface and intersecting at a vertex located within the arc of said bearing surface on said vehicle.

8. An apparatus for guiding a length of seat belt webbing relative to the body of a vehicle, comprising
   a member fixed to the body of the vehicle and having means defining an opening extending through said member;
   a webbing guide having a webbing opening through which the webbing can extend;
   a bolt fixedly attached to said webbing guide and having a portion extending through said opening in said member, said bolt being pivotable relative to said member; and
   means for limiting rotation of said bolt relative to said member comprising a surface on said bolt which abuts stop surfaces on said member after limited rotation of said bolt relative to said member.

9. An apparatus as defined in claim 8 wherein said means defining the opening in said member includes said stop surfaces on said member.

10. An apparatus as defined in claim 9 wherein said portion of said bolt extending through the opening in said member has a flat surface for abutting said stop surfaces on said member.

11. An apparatus as defined in claim 9 including a bearing surface on said bolt for engaging in a force-transmitting manner a bearing surface on said member to transmit force from said webbing to the vehicle.

12. An apparatus as defined in claim 11 wherein said opening is generally heart-shaped, said bearing surface on said member being arcuate and said stop surfaces on said member being flat stop surfaces extending from opposite ends of said bearing surface and intersecting at a vertex located within the arc of said bearing surface on said member.

13. An apparatus as defined in claim 9 wherein said bolt extends through an opening in said webbing guide and said flat surface of said bolt engages a corresponding surface on said webbing guide to fix said bolt for rotation with said webbing guide.

14. An apparatus as defined in claim 9 further including a nut secured to said bolt for holding said bolt axially in position relative to said member.

15. An apparatus as defined in claim 12 wherein said flat surface on said bolt abuts one of said flat stop surfaces on said member to limit rotation of said webbing guide in a first direction of rotation relative to the vehicle, and said flat on said bolt abuts the other one of said flat stop surfaces on said member to limit rotation of said webbing guide in a second direction of rotation opposite to said first direction of rotation.

16. An apparatus as defined in claim 15 wherein rotation of said webbing guide relative to the vehicle in said first direction of rotation is limited to about 23° forward of vertical and rotation of said webbing guide relative to the vehicle in said second direction of rotation is limited to about 14° rearward of vertical.

* * * * *